US012613903B2

(12) United States Patent
Leong et al.

(10) Patent No.: US 12,613,903 B2
(45) Date of Patent: Apr. 28, 2026

(54) COORDINATION OF PARALLEL PROCESSING OF AUDIO QUERIES ACROSS MULTIPLE DEVICES

(71) Applicant: GOOGLE LLC, Mountain View, CA (US)

(72) Inventors: Jian Wei Leong, San Francisco, CA (US); Nicu Cornea, San Jose, CA (US); Maya Tekke Anant, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/883,490

(22) Filed: Sep. 12, 2024

(65) Prior Publication Data

US 2025/0005069 A1     Jan. 2, 2025

Related U.S. Application Data

(63) Continuation of application No. 18/376,712, filed on Oct. 4, 2023, now Pat. No. 12,118,028, which is a
(Continued)

(51) Int. Cl.
G06F 16/00          (2019.01)
G06F 9/38           (2018.01)
(Continued)

(52) U.S. Cl.
CPC .......... G06F 16/433 (2019.01); G06F 9/3885 (2013.01); G06F 16/2379 (2019.01); G06F 16/243 (2019.01); G06F 16/252 (2019.01)

(58) Field of Classification Search
CPC .. G06F 16/243; G06F 16/2379; G06F 16/252; G06F 9/3885; G06F 16/433
See application file for complete search history.

(56) References Cited

U.S. PATENT DOCUMENTS

| | | | |
|---|---|---|---|
| 11,144,584 | B2 | 10/2021 | Leong et al. |
| 11,841,893 | B2 | 12/2023 | Leong et al. |

(Continued)

FOREIGN PATENT DOCUMENTS

| | | |
|---|---|---|
| CN | 103339623 | 10/2013 |
| CN | 105488094 | 4/2016 |

(Continued)

OTHER PUBLICATIONS

Myung-Eun K. et al.; Semantic Network Based Integrated Multi-Level Search System for Smart TV; IEEE Xplore; pp. 1294-1299; dated Feb. 2012.

(Continued)

*Primary Examiner* — Cheryl Lewis
(74) *Attorney, Agent, or Firm* — Gray Ice Higdon

(57)          ABSTRACT

The present disclosure is generally related to a data processing system to coordinate parallel processing of audio queries across multiple devices. A data processing system can receive an audio input signal detected the display device and parse the audio input signal to identify an entity. The data processing system can transmit a query command to the display device to cause a multimedia content application to perform a search for the entity. The data processing system can access at least one of an address database and a multimedia content provider to identify a reference address for the entity. The data processing system can provide the reference address for the entity to cause the display device to present a content selection interface. The content selection interface can include an element for the reference address, prior to completion of the search for the entity performed by the multimedia content application.

20 Claims, 4 Drawing Sheets

Related U.S. Application Data continuation of application No. 17/498,570, filed on Oct. 11, 2021, now Pat. No. 11,841,893, which is a continuation of application No. 16/609,971, filed as application No. PCT/US2017/054854 on Oct. 3, 2017, now Pat. No. 11,144,584.

(51) Int. Cl.

| | |
|---|---|
| *G06F 16/23* | (2019.01) |
| *G06F 16/242* | (2019.01) |
| *G06F 16/25* | (2019.01) |
| *G06F 16/432* | (2019.01) |

(56) References Cited

U.S. PATENT DOCUMENTS

| | | | |
|---|---|---|---|
| 2008/0319943 A1 | 12/2008 | Fischer | |
| 2012/0179673 A1 | 7/2012 | Kelly | |
| 2014/0282660 A1 | 9/2014 | Oztaskent et al. | |
| 2016/0357830 A1 | 12/2016 | Hornkvist et al. | |
| 2017/0068683 A1* | 3/2017 | Bakshi | G06F 16/245 |
| 2017/0103132 A1 | 4/2017 | Wall et al. | |
| 2017/0236524 A1 | 8/2017 | Ray et al. | |
| 2017/0257456 A1 | 9/2017 | Vaish et al. | |
| 2017/0316013 A1* | 11/2017 | Stewart | G06F 16/24578 |
| 2021/0345007 A1 | 11/2021 | Poniatowski et al. | |
| 2022/0027403 A1 | 1/2022 | Leong et al. | |
| 2024/0028633 A1 | 1/2024 | Leong et al. | |

FOREIGN PATENT DOCUMENTS

| | | |
|---|---|---|
| CN | 105701138 | 6/2016 |
| CN | 108140176 | 6/2018 |

OTHER PUBLICATIONS

European Patent Office; Result of Consultation issued in Application No. 17787719.8; 11 pages; dated Sep. 26, 2023.

Cipriani, J.S.; "How to use Spotify's Offline mode on iPhone"; retrieved from the internet: URL:https://www.cnet.com/how-to/how-to-use-spotifys-offline-mode-on-iphone/; 4 pages; dated Aug. 1, 2011.

Subramanya et al.; Transform-based Indexing of Audio Data for Multimedia Databases; IEEE; pp. 211-218; dated 1997.

Naphade et al.; Extraction Semantics from Audiovisual Content: The Final Frontier in Multimedia Retrieval; IEEE Transactions on Neural Networks; vol. 13, No. 4; pp. 793-810; dated Jul. 2022.

China National Intellectual Property Adminstration; Notification of First Office Action issued for Application No. 201780092010.4, 17 pages, dated Mar. 30, 2023.

European Patent Office; Summons to Attend Oral Proceedings Pursuant to Rule 115(1) EPC issued in Application No. 17787719.8; 8 pages; dated Nov. 21, 2022.

European Patent Office; Communication Pursuant to Article 94(3) EPC issued in Application No. 17787719.8; 6 pages; dated Oct. 6, 2021.

Singh et al., "Event-Based Modeling and Processing of Digital Media", CVDB'04, Jun. 13, 2004, pp. 19-26.

Pack et al., "An Event Model and its Implementation for Multimedia Information Representation and Retrieval", 2004 IEEE International Conference on Multimedia and Expo.

European Patent Office; International Search Report and Written Opinion of Ser. No. PCT/US2017/054854; 16 pages; dated Jul. 16, 2018.

China National Intellectual Property Adminstration; Notification on the Grant of Patent Right for Invention issued in Application No. 201780092010.4, 6 pages, dated Aug. 28, 2023.

* cited by examiner

COORDINATION OF PARALLEL PROCESSING OF AUDIO QUERIES ACROSS MULTIPLE DEVICES

RELATED U.S. APPLICATION DATA

Continuation of Ser. No. 18/376,712, filed on Oct. 4, 2023, now U.S. Pat. No. 12,118,028, which is a continuation of Ser. No. 17/498,570, filed Oct. 11, 2021, now U.S. U.S. Pat. No. 11,841,893, which is a continuation of Ser. No. 16/609,971, filed Oct. 31, 2019. now U.S. Pat. No. 11,144, 584, which is a National Stage entry of PCT/US2017/054854, International filing on Oct. 3, 2017.

BACKGROUND

Excessive network transmissions, packet-based or otherwise, of network traffic data between computing devices can prevent a computing device from properly processing the network traffic data, completing an operation related to the network traffic data, or responding timely to the network traffic data. The excessive network transmissions of network traffic data can also complicate data routing or degrade the quality of the response if the responding computing device is at or above its processing capacity, which may result in inefficient bandwidth utilization. A portion of the excessive network transmissions can include transmissions for requests that are not valid requests.

SUMMARY

According to an aspect of the disclosure, a system to coordinate parallel processing of an audio query-based search across multiple devices can include a data processing system. A natural language processor component executed by the data processing system can receive, via an interface, a data packet including an audio input signal detected by a sensor of a display device. The natural language processor component can parse the audio input signal of the data packet to identify a request and an entity from the request. A search coordinator component executed by the data processing system can generate a query command comprising the request identified from parsing the audio signal input. The search coordinator component can transmit, via the interface, the query command to the display device to cause a multimedia content application executing on the display device to perform a search for the entity. A content indexer component executed by the data processing system can access at least one of an address database and a multimedia content provider to identify a reference address corresponding to the entity. A response handler component executed by the data processing system can provide, via the interface to the display device, the reference address for the entity to cause the display device to present a content selection interface. The content selection interface can include a selection element for the reference address of the entity and a placeholder element for the search performed by the multimedia content application, prior to completion of the search for the entity performed by the multimedia content application.

According to an aspect of the disclosure, a method to coordinate parallel processing of an audio query-based search across multiple devices can include a natural language processor component executing on a data processing system receiving via an interface, a data packet including an audio input signal detected by a sensor of a display device. The method can include the natural language processor component parsing the audio input signal of the data packet to identify a request and an entity from the request. The method can include a search coordinator component executed on the data processing system obtaining a query command comprising the request identified from parsing the audio signal input. The method can include the search coordinator component transmitting, via the interface, the query command to the display device to cause a multimedia content application executing on the display device to perform a search for the entity. The method can include a content indexer component executed on the data processing system accessing at least one of an address database and a multimedia content provider to identify a reference address corresponding to the entity. The method can include a response handler component executed on the data processing system providing, via the interface to the display device, the reference address for the entity to cause the display device to present a content selection interface. The content selection interface can include a selection element for the reference address of the entity and a placeholder element for the search performed by the multimedia content application, prior to completion of the search for the entity performed by the multimedia content application.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
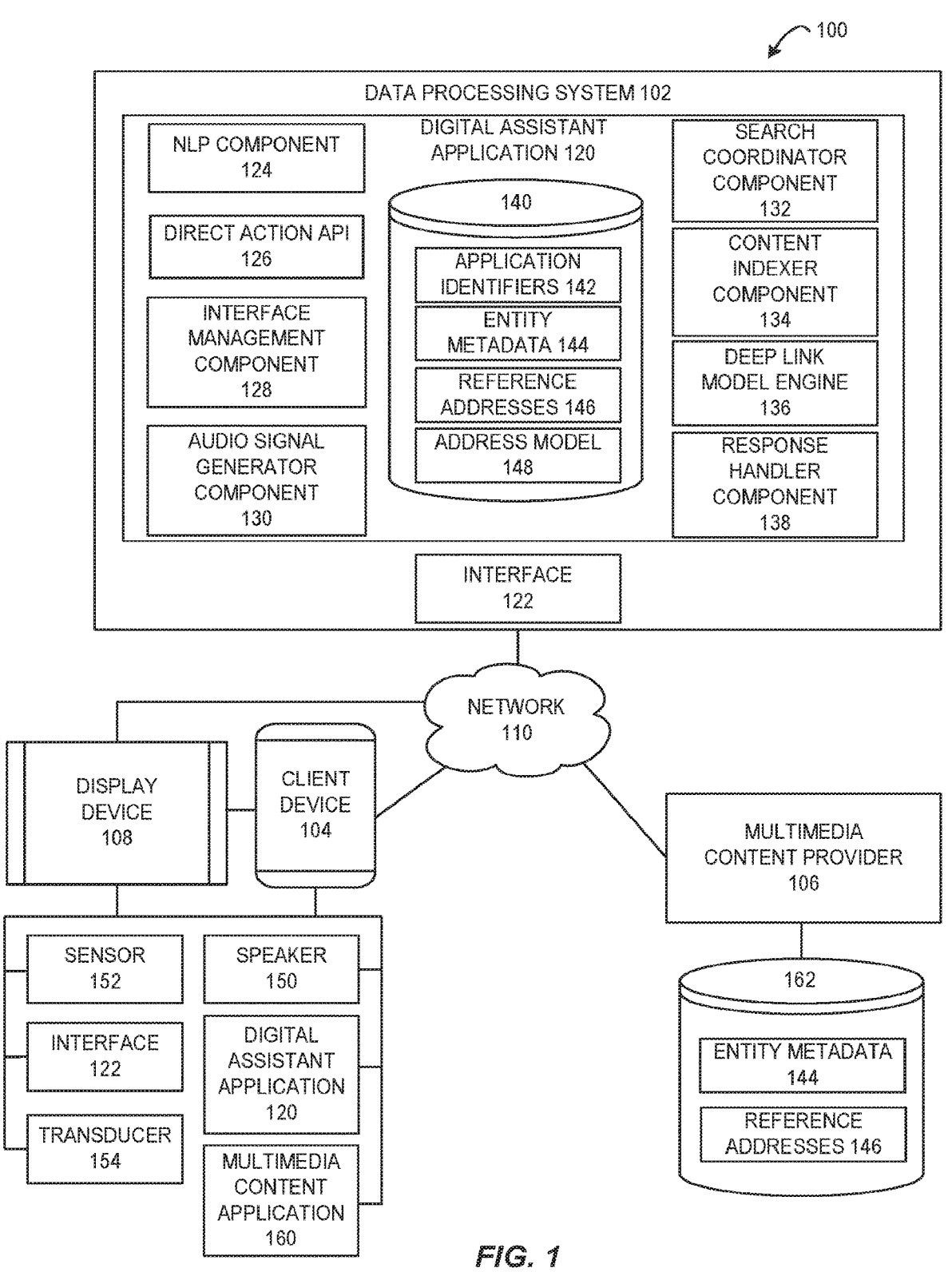
FIG. 1 illustrates an example system to coordinate parallel processing of audio queries across multiple devices.

Following below are more detailed descriptions of various concepts related to, and implementations of, methods, apparatuses, and systems to coordinate parallel processing of audio queries across multiple devices, such as a data processing system, display devices, and client devices. The various concepts introduced above and discussed in greater detail below may be implemented in any of numerous ways.

The present disclosure is generally directed to a data processing system to coordinate parallel processing of audio queries across multiple devices. The systems and methods described herein can include a data processing system that can receive an audio input query, which can also be referred to herein as an audio input signal. From the audio input query, the data processing system can identify a request. The request can include an entity corresponding to multimedia content. A digital assistant application can carry, obtain, respond to, or process the command extracted from the audio input query. The digital assistant application can be a program or script executed on the data processing system or a display device (e.g., a smart television, hybrid television, or a set-top box connected to a television, etc.) and a client device (e.g., a smartphone, tablet, laptop, desktop, etc.) interfacing with the data processing system. The digital assistant application can receive audio input queries, process the requests associated with such queries using natural language processing algorithms, and then present an audio response in a conversational manner.

Multimedia content applications executed on a display device can be used to play, stream, download, or otherwise access multimedia content provided by a multimedia content provider. Searching for all possible sources of the multimedia content in response to a query from the client-side multimedia content applications, however, can consume an excessive amount of time, leading to latency in the retrieving the results to the query. These may be several factors that affect the amount of time that a multimedia content application can retrieve results to the query. For example, the multimedia content applications can utilize a large amount of memory to initialize and then run to play the multimedia content. In initializing, the multimedia content applications can also perform account authentication for the display device with the multimedia content provider, also resulting in more time taken up. Even with the completion of initialization and authentication, accessing the multimedia content provider from the display device to obtain a catalog of available multimedia content can also lead to expending additional time. Furthermore, the display device may lack computing resources such as processing speed and memory to quickly process audio input signals containing the entity. With the confluence of these factors, it can be challenging for such multimedia content applications to timely respond to the query to determine whether the multimedia content provider can provide the multimedia content.

By running the processing of the query on the display device and a data processing system in parallel, the present systems and methods described herein can reduce the amount of time to retrieve search results for the audio-based query. As the display device receives the audio input query, the display device can send a data packet with the audio input query to the data processing system. The data processing system in turn can process the audio input query in the data packet using natural language processing techniques to identify a request and an entity from the request. The entity may include one or more words recognized from the audio input query. The one or more words of the entity may include information related to multimedia content, such as a title, an author, a distributor, a release date, a language, a genre, a time length, and other associated keywords. Using the entity identified from the audio packet, the data processing system can generate and send a query command back to the display device to perform a search using one or more of the multimedia content applications at the display device. The query command can trigger the client device to initialize each multimedia content application, perform authentication with the multimedia content server, and then access a catalog of available multimedia content based on the entity.

In parallel to the search performed by the display device, the data processing system can perform its own search for the entity. The data processing system can access a data repository. The data repository can include a list of reference addresses (e.g., a Uniform Resource Locator) for the entity. The reference address can include a hostname corresponding to a specific multimedia content provider and a file pathname corresponding to the entity hosted on the multimedia content provider. The list of reference addresses may be maintained by the data processing system using machine learning techniques and reference addresses from previous requests across a multitude of display devices. The data processing system can also retrieve results directly from the multimedia content provider by sending another query command. Upon receipt of the query command, the multimedia content provider can access its own data repository for the reference address corresponding to the entity.

Once the reference address for the entity is identified, the data processing system can send the search result to the display device. In response, the display device can present a display card. The display card can have a selection element to open and play the multimedia content identified by the reference address and a placeholder element for the search performed by the multimedia content application executing on the display device. Subsequent interaction with the placement element can cause the display device to replace the placeholder element with another reference address from the search locally performed by the multimedia content application.

The present solution can improve efficiency and effectiveness of auditory data packet processing by coordinating audio-based query searches in parallel. As the data processing system does not perform initialization, authentication, or additional processes of multimedia content applications executed on the display device, the data processing system can retrieve results faster than the display device, thereby lowering latency. From a human-computer interaction (HCI) perspective, this parallel processing of the audio-based search query can lead to a decrease in perceived latency, in addition to the reduction in actual latency.

FIG. 1 illustrates an example system 100 to coordinate parallel processing of audio queries across multiple devices. The system 100 can include at least one data processing system 102, at least one multimedia content provider 106, one or more client devices 104, one or more display devices 108, and a network 110. A display device 108 can be coupled to the client device 104 via wire or wireless connection (e.g., through the network 110, short-range communications, or pairing). The client device 104 can be a part of the display device 108, or otherwise be integrated into the display device. The at least one data processing system 102, one or more client devices 104, and one or more display devices 108 can be communicatively coupled to one another via the network 110.

The data processing system 102 can include an interface 122. The data processing system 102 can include a digital assistant application 120. The data processing system 102 can include a natural language processor (NLP) component 124 to parse audio-based inputs. The data processing system 102 can include an interface management component 128 to detect and manage the interfaces of other devices in the system 100. The data processing system 102 can include an audio signal generator component 130 to generate audio-based signals. The data processing system 102 can include a direct action application programming interface (API) 126 to fulfill requests parsed from audio-based inputs. The data processing system 102 can include an audio signal generator component 130 to select responses to audio-based input signals. The data processing system 102 can include a data repository 140. The data processing system 102 can also include a search coordinator component 132, a content indexer component 134, a deep link model engine 136, and a response handler component 138. The NLP component 124, the interface management component 128, the audio signal generator component 130, the data repository 140, the direct action API 126, the interface management component 128, the search coordinator component 132, the content indexer component 134, the deep link model engine 136, and the response handler component 138 can form the digital assistant application 120.

The functionalities of the data processing system 102, such as the digital assistant application 120, can be included or otherwise be accessible from the one or more client devices 104 and the one or more display devices 108. The functionalities of the data processing system 102 may correspond to the functionalities or interface with the digital assistant application 120 executing on the client devices 104 or the display devices 108. The client devices 104 and the display devices 108 can each include and execute a separate instance of the one or more components of the digital assistant application 120. The client devices 104 and the display devices 108 can otherwise have access to the functionalities of the components of the digital assistant application 120 on a remote data processing system 102 via the network 110. For example, the display device 108 can include the functionalities of the NLP component 124 and access the remainder of the components of the digital assistant application 120 via the network 110 to the data processing system 102. The data processing system 102, the client device 104, and the display device 108 can include and execute a separate instance of the components of the digital assistant application 120. The digital assistant application 120 accessible or executing on the client devices 104 and the display devices 108 may each have different functionalities.

The client devices 104 and the display devices 108 can each include at least one logic device such as a computing device having a processor to communicate with each other with the data processing system 102 via the network 110. The client devices 104 and the display devices 108 can include an instance of any of the components described in relation to the data processing system 102. The client devices 104 can include a desktop computer, laptop, tablet computer, personal digital assistant, smartphone, mobile device, portable computer, thin client computer, virtual server, a speaker-based digital assistant, or other computing device. The display device 108 can include a smart television, a hybrid television, a connected television, a set-top box connected to a television, a digital video record, monitor, screen, or other computing device with display functionality. The client devices 104 can be communicatively coupled with the display devices 108. For example, once paired, a client device 104 may function as a remote control to control various functionalities at the display device 108. The client devices 104 can be a part of or integrated with the display device 108.

The components of the system 100 can communicate over a network 110. The network 110 can include, for example, a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, an NFC (Near-Field Communication) network, a local area network (LAN), a wireless network or a wireline network, and combinations thereof. The network 110 can include a wireless link, such as an infrared channel or satellite band. The topology of the network 110 may include a bus, star, or ring network topology. The network 110 can include mobile telephone networks using any protocol or protocols used to communicate among mobile devices, including advanced mobile phone protocol (AMPS), time division multiple access (TDMA), code-division multiple access (CDMA), global system for mobile communication (GSM), general packet radio services (GPRS), or universal mobile telecommunications system (UMTS). Different types of data may be transmitted via different protocols, or the same types of data may be transmitted via different protocols.

The network 110 can include a short-range communication link (e.g., ranging up to 30 meters) established between the client devices 104 and the display devices 108, using Bluetooth, Bluetooth Low Energy, Dedicated Short-Range Communications (DSRC), or Near-Field Communications (NFC) protocols. Using such protocols, the data processing system 102 can establish a communication link with one or more client devices 104 via the interface 122. The data processing system 102 can establish a communication link with one or more display devices 108 via the interface 122. The short-range communication link may be established between the client devices 104 and the display devices 108 via pairing protocol.

The client devices 104 can also include sensors 152, speakers 150, interfaces 122, and transducers 154. The display devices 108 can also include sensors 152, speakers 150, interfaces 122, and transducers 154. The client devices 104 and the display device 108 can include at least one sensor 152, at least one transducer 154, at least one audio driver, and at least one speaker 150. The sensor 152 can include a microphone or audio input sensor. The sensor 152 can also include at least one of a GPS sensor, proximity sensor, ambient light sensor, temperature sensor, motion sensor, accelerometer, or gyroscope. The sensor can include an occupancy or weight sensor. The transducer 154 can convert the audio input into an electronic signal. The audio driver can include a script or program executed by one or more processors of the client devices 104 or the display device 108 to control the speaker 150. The speaker 150 can render audio signals by converting electrical signals into audible waves. The client device 104 and the display device 108 can each include peripheral devices, such as a keyboard, a pointing device, a monitor (built-in or independent), and headphones, among other devices.

The client devices 104 and the display device 108 can each execute an instance of a multimedia content application 160. The multimedia content application 160 can be associated with a particular multimedia content provider 106. The multimedia content application 160 can include a script or a program installed at the client device 104 or the display device 108. The multimedia content application 160 can include a script or a program executable via another application installed at the client device 104 or the display device 108, such as a web browser. The multimedia content application 160 can include an application programming interface (API) that can allow other applications (e.g., the digital assistant application 120) at the client device 104 or the display device 108 to interface with the multimedia content application 160. The multimedia content application 160 can play, stream, download, or otherwise access multimedia content. The multimedia content may correspond to one or more audiovisual content files in any format, such as MP3, ACC, OPUS, RTMP, RTP, MP4, FLV, WebM, ASF, ISMA, HEVC, H.264, VP8, VP9, HLS, HDS, and SMIL, among others. The one or more audiovisual content files can include audio and/or visual content for play at the client device 104 or the display device 108. Upon loading of the one or more audiovisual content files, the multimedia content application 160 can play or stream the multimedia content on the client device 104 or the display device 108.

The multimedia content application 160 can also perform an authentication process with the multimedia content provider 106. The authentication process can include identification of an account identifier and an access code at the client device 104 or the display device 108 via input or retrieval from storage. Upon receipt, the multimedia content application 160 can send the account identifier and the access code to the multimedia content provider 106. The multimedia content provider 106 in turn can compare its own stored access code for the account identifier with the access code received from the client device 104 or the display device 108. Responsive to determining a match between the two access codes, the multimedia content provider 106 can send a successful authentication indicator to the client device 104 or the display device 108.

Responsive to receipt of the successful authentication indicator, the multimedia content application 160 can retrieve a catalog of available multimedia content made available by the multimedia content provider 106 for the account identifier. The multimedia content application 160 can display the catalog of available multimedia content in a graphical user interface with each element corresponding to each available multimedia content. Upon interaction with one of the elements of the graphical user interface, the multimedia content application 160 can send a request for the selected multimedia content to the multimedia content provider 106. The multimedia content provider 106 can identify and provide the one or more audiovisual content files corresponding to the selected multimedia content. The multimedia content application 160 in turn can store, play, or stream the one or more audiovisual content files corresponding the selected multimedia content at the client device 104 or the display device 108. Additional details regarding the functionality of the multimedia content provider 106 and the multimedia content application 160 in the context of system 100 are explained herein.

An application, script, program, or other components that are associated with the data processing system 102 can be installed at the client devices 104 or the display device 108. The application can enable the client devices 104 or display device 108 to communicate input audio signals (and other data) to the interface 122 of the data processing system 102. The application can enable the client devices 104 and the display device 108 to drive components of the client devices 104 and the display device 108 to render the output audio signals.

The client devices 104 and the display device 108 can be associated with an end user that enters voice queries as input audio signals into the client devices 104 or the display device 108 (via the sensor 152) and receives audio output in the form of a computer generated voice that can be provided from the data processing system 102. In response to the input audio signals, the client devices 104 and the display device 108 can also receive action data structures to perform predetermined functions or actions. The interface 122 can receive or provide data messages to the direct action API 126 of the data processing system 102 and enable communication between the components of the system 100. The client devices 104 and the display device 108 can also include a user interface that enables a user to interact with the components of the system 100.

The data processing system 102 can include at least one server having at least one processor. For example, the data processing system 102 can include a plurality of servers located in at least one data center or server farm. The data processing system 102 can determine from an audio input signal a request and a trigger keyword associated with the request. Based on the request and trigger keyword, the data processing system 102 can generate or select response data. The response data can be audio-based or text-based. For example, the response data can include one or more audio files that, when rendered, provide an audio output or acoustic wave. The data within the response data can also be referred to as content items. The response data can include other content (e.g., text, video, or image content) in addition to audio content.

The data processing system 102 can include multiple, logically grouped servers and facilitate distributed computing techniques. The logical group of servers may be referred to as a data center, server farm, or a machine farm. The servers can be geographically dispersed. A data center or machine farm may be administered as a single entity, or the machine farm can include a plurality of machine farms. The servers within each machine farm can be heterogeneous—one or more of the servers or machines can operate according to one or more type of operating system platform. The data processing system 102 can include servers in a data center that are stored in one or more high-density rack systems, along with associated storage systems, located for example in an enterprise data center. In this way, the data processing system 102 with consolidated servers can improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage. Each of the components of the data processing system 102 can include at least one processing unit, server, virtual server, circuit, engine, agent, appliance, or other logic device such as programmable logic arrays configured to communicate with the data repository 140 and with other computing devices.

The data processing system 102 can include the data repository 140. The data repository 140 can include one or more local or distributed databases and can include a database management system. The data repository 140 can include computer data storage or memory and can store one or more application identifiers 142, one or more entity metadata 144, one or more reference addresses 146, and an address model 148. Each application identifier 142 may be an alphanumeric value corresponding to a multimedia content application 160 to be executed on the client device 104 or the display device 108. Each entity metadata 144 can correspond to an entity. Each reference address 146 can identify or reference. Details of the use and functionalities of the one or more application identifiers 142, one or more entity metadata 144, one or more reference addresses 146, and the address model 148 are provided below.

The data repository 140 can include computer data storage or memory and can store one or more parameters, one or more policies, response data, and templates, among other data. The parameters, policies, and templates can include information such as rules about a voice based session between the client devices 104, the data processing system 102, and the display device 108. The parameters, policies, and templates can also include information for another digital assistant application 120 received via the interface 122 from another source (e.g., the data processing system 102, the client devices 104, and the display devices 108). For example, the parameters, policies, and templates stored in the data repository 140 of a digital assistant application 120 hosted on a client device 104 or a display device 108 can include the parameters, policies, and templates from the data repository 140 of a digital assistant application 120 accessible via the client device 104 and the display device 108, and vice-versa. In this manner, the parameters, policies, and templates of different digital assistant applications 120 may be shared and used by one another. The response data can include content items for audio output or associated metadata, as well as input audio messages that can be part of one or more communication sessions with the client devices 104 and the display devices 108.

The NLP component 124 can receive input audio signals. The data processing system 102 can receive the input audio signal from the client devices 104 or the display device 108 (e.g., via the transducers 154 or the sensors 152) included in a data packet. The data packet can also include a device identifier associated with the client device 104 or the display device 108. The data packet can also include an application identifier of the multimedia content application 160 executable at the client device 104 or the display device 108. The functionalities of the NLP component 124 can be split among the data processing system 102, the client device 104, and the display device 108. For example, the NLP component 124 executing on the client device 104 or the display device 108 can package the input audio signal detected at the sensors 152 into a data packet, and can send the data packet to the data processing system 102 for further processing at the NLP component 124 executed at the data processing system 102.

The NLP component 124 can convert input audio signals into recognized text by comparing the input audio signal against a stored, representative set of audio waveforms and choosing the closest matches. The representative waveforms can be generated across a large set of input audio signals. Once the input audio signal is converted into recognized text, the NLP component 124 can match the text to words that are associated, for example, via a learning phase, with actions or output audio signals.

From the input audio signal, the NLP component 124 can identify at least one request. The request can indicate intent or subject matter of the input audio signal. The request can indicate a type of action likely to be taken. For example, the NLP component 124 can parse the input audio signal to identify at least one request to play multimedia content (e.g., "Okay, play Bat Movie from 2015"). The request can include at least one word, phrase, root or partial word, or derivative indicating an action to be taken. The request can also include a trigger keyword, such "okay" or "go." The NLP component 124 can detect the trigger keyword in the request. Responsive to the detection of the trigger keyword, the NLP component 124 can identify the intent, the subject matter, and the type of action to be taken from the input audio signal.

The NLP component 126 can also identify at least one entity from the request. The at least one entity can correspond to the at least one word, phrase, root or partial word, or derivative in the request. The at least one entity may include a descriptor for a multimedia content, such as a title, an author, a distributor, an original release date, a language, a genre, a time length, and other associate keywords (e.g., actor names). For example, the entity for "Bat Movie I" film released in 2005 may include: "Bat Movie I" as the title, "Ms. Director" as the author, "Jun. 15, 2005" as the original release date, "English" as the language, "Action" as the genre, and "140 minutes" as the length, among other information. The NLP component 126 can determine that the at least one word, phrase, root or partial word, or derivative in the request corresponds to at least one entity. To perform the determination, the NLP component 126 can access a semantic knowledge graph. The semantic knowledge graph can specify a set of words, phrases, root or partial words, or derivatives relating to the at least one entity. The semantic knowledge graph can include nodes connected to one another via edges. Nodes may be associated with a word, phrase, root or partial word, or a derivative, and may be marked related to at least one entity or unrelated. Each edge connecting two nodes can represent a relationship between the two. Continuing from the previous example, a node for "Bat Movie" in the semantic knowledge graph may be marked as related to an entity and can have edges to a node labeled "Bat Movie I" also labeled as related to an entity indicating a relationship between the two terms. Using the semantic knowledge graph, the NLP component 126 can determine that the at least one word, phrase, root or partial word, or derivative in the request corresponds to the at least one entity.

The NLP component 124 can also determine whether the at least one request corresponds to a query for multimedia content based on the entity. Responsive to the identification that the at least one word, phrase, root or partial word, or derivative in the request corresponds to the at least one entity, the NLP component 124 can determine that the at least one request corresponds to the query for multimedia content. Responsive to the identification that none of the words, phrases, root or partial words, or derivatives in the request correspond to the at least one entity, the NLP component 124 can determine that the at least one request does not correspond to the query for multimedia content. The determination that the at least one request corresponds to the query for multimedia content can trigger the functionalities of the search coordinator component 132, the content indexer component 134, the deep link model engine 136, and the response handler component 138, as detailed below.

The audio signal generator component 130 can obtain information from the data repository 140 where it can be stored as part of the response data. The audio signal generator component 130 can query the data repository 140 to select or otherwise identify response phrases or content items, e.g., from the response data. The audio signal generator component 130 can generate or otherwise obtain an output signal that includes the content item. The data processing system 102 can execute the audio signal generator component 130 to generate or create an output signal corresponding to the content item or request. For example, once a request is fulfilled, the audio signal generator component 130 can generate an audio output signal that includes the phrase "The action was completed."

The interface 122 can be a data interface or a network interface that enables the components of the system 100 to communicate with one another. The interface 122 of the data processing system 102 can provide or transmit one or more data packets that include the action data structure, audio signals, or other data via the network 110 to the client devices 104 or display device 108. For example, the data processing system 102 can provide the output signal from the data repository 140 or from the audio signal generator component 130 to the client devices 104. The data processing system 102 can also instruct, via data packet transmissions, the client devices 104 or the display device 108 to perform the functions indicated in the action data structure. The output signal can be obtained, generated, transformed to, or transmitted as one or more data packets (or other communications protocol) from the data processing system 102 (or other computing device) to the client devices 104 or the display device 108.

The direct action API 126 of the data processing system 102 can generate, based on, for example, the request, action data structures. The action data structure can include data or instructions for the execution of a specified action to satisfy the request. In some implementations, the action data structure can be a JSON formatted data structure or an XML formatted data structure.

Depending on the action specified in the request, the direct action API 126 can execute code or a dialog script that identifies the parameters required to fulfill the request. The action data structures can be generated responsive to the request. The action data structure can be included in messages that are transmitted to or received by the client devices 104 or the display device 108. The direct action API 126 can package the request into an action data structure for transmission to the display device 108. The direct action API 126 can access a device identifier from the response data to determine which the client device 104 or the display device 108 is associated with the user that generated the request. Once received, the display device 108 can process the action data structure and can perform the indicated action. The direct action API 126 can also package the request into an action data structure for execution by the client device 104 or the display device 108. Once received, the client device 104 can process the action data structure using the digital assistant application 120 or one or more applications running on the client device 104.

The action data structure can include information for completing the request. For example, the action data structure can be an XML or JSON formatted data structure that includes attributes used in completing or otherwise fulfilling the request. The attributes can include a location of the display device 108, a location of the client devices 104, an authorization level of a user associated with a client device 104, a device identifier, an interface identifier, a vehicular state, or a request state. In some implementations, the request state includes one or more attributes that should be satisfied before the action is fulfilled. For example, with the request "Ok, change the song," the request state may have the attribute {requestor: [authorized, passenger]}, indicating that the request should be an explicitly authorized user.

The direct action API 126 can retrieve a template from the data repository 140 to determine which fields or attributes to include in the action data structure. The direct action API 126 can determine necessary parameters and can package the information into an action data structure. The direct action API 126 can retrieve content from the data repository 140 to obtain information for the attributes of the data structure.

The direct action API 126 can populate the fields with data from the input audio signal. The direct action API 126 can also populate the fields with data from the client devices 104 or the display device 108, or from another source. The direct action API 126 can prompt a user for additional information when populating the fields. The templates can be standardized for different types of actions, responding to messages, and performing functions within the client device 104 or the display device 108. The action data structure can initially be generated by a direct action API 126 executed by a remote data processing system 102. The remote data processing system 102 can transmit the action data structure to the client device 104 or the display device 108, which can add fields and attributes to the action data structure.

The direct action API 126 can obtain response data (or parameters or policies) from the data repository 140, as well as data received with end user consent from the client devices 104 or the display devices 108. The response data (or parameters or policies) can be included in the action data structure. When the content included in the action data structure includes end user data that is used for authentication, the data can be passed through a hashing function before being stored in the data repository 140.

The data processing system 102 can include, interface, or otherwise communicate with the search coordinator component 132. The search coordinator component 132 can generate a query command to send to the client device 104 or the display device 108. The generation of the query command by the search coordinator component 132 can be in response to the determination at the request corresponds to the query for multimedia content. The query command can include the entity identified from the response. The query command can also include instructions for the client device 104 or the display device 108 to process the query command. The instructions may indicate which multimedia content application 160 on the client device 104 or the display device 108 is to perform a search for the entity. To generate the instructions, the search coordinator component 132 can access the data repository 140 to identify the one or more application identifiers 142 to include in the query command. The data repository 140 can identify the one or more application identifiers 142 by the device identifier associated with the client device 104 or the display device 108. Each application identifier 142 may also be labeled by a frequency of use by the client device 104 or the display device 108. The search coordinator component 132 can also insert the one or more application identifiers 142 in the initial data packet into the instructions of the query command. The search coordinator component 132 can identify a subset of application identifiers 142 for the client device 104 and the display device 108 based on the frequency of usage by the client device 104 and the display device 108. For example, the search coordinator component 132 can identify that the display device 108 uses multimedia content applications 160 "A" and "B" more frequently than multimedia content applications 160 "C", "D", and "E." In this example, the search coordinator component 132 can select the application identifiers 142 corresponding to the multimedia content applications 160 for insertion into the query command. Each application identifier 142 of the query command can indicate which multimedia content application 160 on the client device 104 or the display device 108 is to perform the search for the entity. Subsequent to the generation of the query command, the search coordinator 132 can transmit the query command to the client device 104 or the display device 108.

Receipt of the query command can cause the client device 104 or the display device 108 to the multimedia content application 160 to perform the search for the entity. Responsive to receipt of the query command, the client device 104 or the display device 108 can parse the query command to identify the entity. The client device 104 or the display device 108 can parse the query command to also identify the one or more application identifiers 142. The client device 104 or the display device 108 can identify the multimedia content applications 160 corresponding to the one or more application identifiers 142 of the query command. The client device 104 or the display device 108 can initiate execution of the multimedia content application 160 identified from the one or more application identifiers 142 of the query command. To perform the search, the client device 104 or the display device 108 can provide the at least one entity in the query command to each multimedia content application 160 via the application programming interface for the multimedia content application 160. Once the entity is provided, each multimedia content application 160 can send a query request to the associated multimedia content provider 106.

In parallel to the generation and sending of the query command to the client device 104 or the display device 108, the search coordinator component 132 can also generate a query request to send to the multimedia content provider 106. The generation of the query request by the search coordinator component 132 can be in response to the determination at the request corresponds to the query for multimedia content. The generation of the query request by the search coordinator component 132 can be in response to an invocation by the content indexer component 134, as will be discussed below. The query request can include the entity identified from the response. The query request can also include instructions for the multimedia content provider 106 to process the query request. The search coordinator 132 can identify which multimedia content providers 106 to send the query requests from the one or more application identifiers 142 for the client device 104 or the display device 108. Subsequent to the generation of the query request, the search coordinator 132 can transmit the query request to the multimedia content provider 106.

Receipt of the query request from the client device 104, the display device 108, or the search coordinator component 132 can cause the multimedia content provider 106 to perform the search for the entity. As the client device 104 or the display device 108 may have initialized the multimedia content application 160 to send the query request, the query request from the client device 104 or the display device 108 may be received subsequent to the query request from the search coordinator component 132. The multimedia content provider 106 can access a content data repository 162 in response to the query request. The content data repository 162 can include one or more entity metadata 144 and one or more reference addresses 146. Each entity metadata 144 can correspond to an entity. Each entity metadata 144 on the data repository 162 can include one or more entries about the multimedia content corresponding to the entity, such as the title, author, distributor, original release date, language, genre, time length, and other associated keywords. For example, one entity metadata 144 can correspond to "Bat Movie I" and another entity metadata 144 can correspond to "Bat Movie II." Each entity metadata 144 can also be associated with a reference address 146 (e.g., a Uniform Resource Locator). The reference address 146 may include a hostname, a file pathname, and a query parameter. The hostname can correspond to the multimedia content provider 106. The file pathname can correspond to the one or more audiovisual files for the multimedia content corresponding to the entity. The query parameter can include an attribute-value pair. The query parameter can be dynamically generated by the multimedia content provider 106, and may vary per the client device 104, the display device 108, or the search coordinator component 132.

Based on the entity from the query request, the multimedia content provider 106 can identify the reference address 146 corresponding to the entity. The multimedia content provider 106 can traverse through the content data repository 162. For each entity metadata 144, the multimedia content provider 106 can compare the entity with the entity metadata 144. For example, the multimedia content provider 106 can compare the entity "Bat Movie" to any of the entries for the entity metadata 144, such as the title. The multimedia content provider 106 can determine whether the one or more entries of the entity metadata 144 match the entity from the query request. The multimedia content provider 106 can determine that there is no match between the entity and the entity metadata 144. Responsive to the determination that there is no match, the multimedia content provider 106 can continue traversing the content data repository 162. The multimedia content provider 106 can determine that there are no more entity metadata 144 to traverse. Responsive to the determination that there are no more entity metadata 144 to traverse, the multimedia content provider 106 can determine that the entity does not exist on the content data repository 162. The multimedia content provider 106 can also transmit a null response. The null response can indicate that the multimedia content provider 106 does not have multimedia content corresponding to the entity.

Conversely, the multimedia content provider 106 can determine that there is a match between the entity and the entity metadata 144. Responsive to the determination of the match, the multimedia content provider 106 can determine that the entity exists on the content data repository 162. The multimedia content provider 106 can identify the reference address 146 corresponding to the entity metadata 144 matching the entity. The multimedia content provider 106 can generate a search response. The search response can indicate that the multimedia content provider 106 does have the multimedia content corresponding to the entity. The search response can include the reference address 146 corresponding to the multimedia content for the entity.

The multimedia content provider 106 can continue to traverse through the content data repository 162 to identify additional matches between the entity of the query request and the entity metadata 144. With additional matches, the multimedia content provider 106 can repeatedly identify the reference address 146 corresponding to the entity metadata 144 matching the entity and can include the reference address 146 into the search response. The multimedia content provider 106 can determine that there are no more entity metadata 144 to traverse. Responsive to the determination that there are no more entity metadata 144 to traverse, the multimedia content provider 106 can send the response to the client device 104, the display device 108, or the search coordinator component 132 that sent the query search.

The data processing system 102 can include, interface, or otherwise communicate with the content indexer component 134. The content indexer component 134 can access the data repository 140 of the data processing system 102 or the multimedia content provider 106 to identify the reference address 146 corresponding to the entity. The content indexer component 134 can access the data repository 140, prior to accessing the multimedia content provider 106 to identify the reference address 146. The content indexer component 134 can traverse through the data repository 140. In addition to the application identifiers 142, the data repository 140 can include the one or more entity metadata 144 and the one or more reference addresses 146. The entity metadata 144 and the reference addresses 146 on the data repository 140 may be maintained separately and independently from the entity metadata 144 and the reference addresses 146 on the content data repository 162. The entity metadata 144 and the reference addresses 146 on the data repository 140 may be from previous search responses from the multimedia content providers 106. The content indexer component 134 can maintain a timer to keep track of a time elapsed for each entity metadata 144 and the associated reference address 146 in storage at the data repository 140.

The content indexer component 134 can traverse through the content data repository 140. For each entity metadata 144, the content indexer component 134 can compare the entity with the entity metadata 144. For example, the content indexer component 134 can compare the entity "Bat Movie" to any of the entries for the entity metadata 144, such as the title. The content indexer component 134 can determine whether the one or more entries of the entity metadata 144 match the entity from the query request. The content indexer component 134 can determine that there is no match between the entity and the entity metadata 144. Responsive to the determination that there is no match, the content indexer component 134 can continue traversing the content data repository 140. The content indexer component 134 can determine that there are no more entity metadata 144 to traverse. Responsive to the determination that there are no more entity metadata 144 to traverse, the content indexer component 134 can determine that the entity does not exist on the content data repository 140. In response to the determination that the entity does not exist on the content data repository 140, the content indexer component 134 can call the search coordinator component 132 to send the query request to the multimedia content provider 106 to retrieve the reference address 146.

Conversely, the content indexer component 134 can determine that there is a match between the entity and the entity metadata 144. Responsive to the determination of the match, the content indexer component 134 can determine that the entity exists on the content data repository 140. The content indexer component 134 can identify the reference address 146 corresponding to the entity metadata 144 matching the entity. The content indexer component 134 can store the reference address 146 corresponding to the entity.

The content indexer component 134 can identify the time elapsed for the identified reference address 146. The content indexer component 134 can compare the time elapsed to a pre-set expiration time. The pre-set expiration time can range from 1 hour to 1 month, as the multimedia content provider 106 may periodically update or change the catalogue of available multimedia content. The pre-set expiration time can correspond to an amount of time that the reference address 146 is valid for the entity at the multimedia content provider 106. The content indexer component 134 can determine that the time elapsed is less than the pre-set expiration time. Responsive to the determination that the time elapsed is less than the pre-set expiration time, the content indexer component 134 can store the reference address 146 corresponding to the entity. The content indexer component 134 can also terminate accessing of the multimedia content provider 106 to search for the reference address corresponding to the entity.

On the other hand, the content indexer component 134 can determine that the time elapsed is greater than or equal to the pre-set expiration time. Responsive to the determination that the time elapsed is greater than or equal to the pre-set expiration time, the content indexer component 134 can replace the reference address 146 from the data repository 140. To update the data repository 140, the content indexer component 134 can call the search coordinator component 132 to send the query request to the multimedia content provider 106 to retrieve the reference address 146. The content indexer component 134 can receive the search response from the multimedia content provider 106. The search response can include a new reference address 146 for the entity. Responsive to the receipt of the reference address 146 from the multimedia content provider 106, the content indexer component 134 can save the reference address 146 onto the data repository 140 and can associate the newly saved reference address 146 with the entity metadata 144 matching the entity. The content indexer component 134 can receive the null response from the multimedia content provider 106. Responsive to the receipt of the null response, the content indexer component 134 can remove the reference address 146 from the data repository 140.

The content indexer component 134 can continue to traverse through the content data repository 140 to identify additional matches between the entity of the query request and the entity metadata 144. With additional matches, the content indexer component 134 can repeatedly identify the reference address 146 corresponding to the entity metadata 144 matching the entity and can include the reference address 146 into the search response. The content indexer component 134 can determine that there are no more entity metadata 144 to traverse. Responsive to the determination that there are no more entity metadata 144 to traverse, the content indexer component 134 can terminate the search for additional reference addresses 146 at the data repository 140. Subsequent to the traversal, the content indexer component 134 can also call the search coordinator component 132 to send the query request to the multimedia content provider 106 to retrieve the reference address 146. The calling of the search coordinator component 132 may be irrespective of the comparison of the time elapsed with the pre-set expiration time described above.

Subsequent to calling the search coordinator component 132 to send the query request, the content indexer component 134 can receive the search response from the multimedia content provider 106. Receipt of the search response from the multimedia content provider 106 can indicate that the multimedia content provider 106 has access to the entity. The search response can include the reference address 146 corresponding to the entity. The content indexer component 134 can parse the search response to identify the reference address 146. Responsive to the identification of the match between the entity and the entity metadata 144 on the data repository 140, the content indexer component 134 can compare the reference address 146 from the data repository 140 with the reference address 146 from the multimedia content provider 106. The content indexer component 134 can determine that the reference address 146 from the data repository 140 differs from the reference address 146 from the multimedia content provider 106. The difference in reference addresses 146 may signify that the multimedia content provider 106 has updated the reference address 146 for the entity. Responsive to the determination that the reference addresses 146 differ, the content indexer component 134 can replace the reference address 146 stored at the data repository 140 with the reference address 146 from the multimedia content provider 106. The content indexer component 134 can determine that the reference address 146 from the data repository 140 is identical from the reference address 146 from the multimedia content provider 106. Responsive to the determination that the reference addresses 146 are identical, the content indexer component 134 can proceed to call the response handler component 138 to send a query result to the client device 104 or the display device 108, as described below.

The content indexer component 134 can also receive a null response from the multimedia content provider 106. Receipt of the null response from the multimedia content provider 106 can indicate that the multimedia content provider 106 no longer has the entity. For example, the multimedia content provider 106 may have updated the catalogue of available multimedia content to exclude the entity.

Responsive to the receipt of the null response and to the identification of the match between the entity and the entity metadata 144 on the data repository 140, the content indexer component 134 can remove the reference address 146 from the data repository 140. the content indexer component 134 can proceed to call the response handler component 138 to send a query result to the client device 104 or the display device 108, as described below. In some cases, the content indexer component 134 may receive no responses from the multimedia content provider 106 within a predetermined amount of time subsequent to transmission of the query response, for example, due to issues with the network 110 or an outage at the multimedia content provider 106. In such instances, the content indexer component 134 can maintain the reference addresses 146 at the data repository 140.

The data processing system 102 can include, interface, or otherwise communicate with the deep link model engine 136. As the content indexer component 132 receives the search responses from the multimedia content provider 106, the deep link model engine 136 can maintain the address model 148 for the multimedia content provider 106 to generate an address structure for the reference addresses 146. The address model 148 may be an artificial neural network (ANN), a Bayesian model, a Gaussian mixture model, a support vector machine, or a decision tree, among others, to represent and recognize an address structure of the reference addresses 148 for the multimedia content provider 106. The reference addresses 148 received by the content indexer component 132 may be a deep link. For example, the deep link may be in the form "www.example_mp.com/video33?123&987" or "e_mp://stream?=vid45670." The reference addresses 148 can include the hostname corresponding to the multimedia content provider 106, the file pathname to the one or more audiovisual content files for the multimedia content corresponding to the entity, and the query string. In the previous example, the hostname may be "example_mp.com", the pathname maybe "/video33", and the query string may be "?123&987." A subset of the characters forming the file pathname or the query string of the reference address 148 may vary based on attributes of the recipient device (e.g., the client device 104, the display device 108, and the data processing system 102), even for the same one or more audiovisual content files. Examples of attributes may include an account identifier, a device type, resolution of display, a location identifier, a platform application (e.g., the web browser to run the multimedia content application 106), and an operating system, among others.

The deep link model 136 can use the reference addresses 146 received from the multimedia content provider 106 and the attributes of the client device 104, the display device 108, and the data processing system 102 as inputs of the address model 148. Using the inputs of the address model 148, the deep link model engine 136 can train the address model 148. In training the address model 148, the deep link model 136 can maintain a comparator to keep track of which indexes of characters vary across the reference addresses 148 for the multimedia content provider 106.

Using the address model 148, the deep link model engine 136 can generate the address structure for the reference addresses 146 of the multimedia content provider 106. Using the address model 148, the deep link model engine 136 can also determine the address structure for newly received reference addresses 146 of the multimedia content provider 106. The address structure can specify an index of characters identified as static across the reference addresses 146 for the multimedia content provider 106. The address structure can specify an index of characters identified as variable across the reference addresses 146 for the multimedia content provider 106. For each newly received reference address 146, the deep link model engine 136 can remove identify a static portion based on the index of characters identified as static. For each newly received reference address 146, the deep link model engine 136 can identify a variant portion based on the index of characters identified as variable. The deep link model engine 136 can maintain characters of the reference address 148 corresponding to static portion. The deep link model engine 136 can remove characters of the reference address 148 corresponding to the variant portion. The deep link model engine 136 can then add the reference address 148 with the characters corresponding to the variant portion removed into the data repository 140.

The data processing system 102 can include, interface, or otherwise communicate with the response handler component 138. Responsive to identification of the reference address 148 corresponding to the entity in the request, the response handler component 138 can transmit or provide the reference address 148 to the client device 104 or the display device 108. The response handler component 138 can also generate also generate instructions for rendering a content selection interface at the client device 104 or the display device 108. The content selection interface can include one or more selection elements and a placeholder element (collectively sometimes referred to as a "display card"). The one or more selection elements can correspond to a reference address 148 for the entity included in the request of the client device 104 or the display device 108. The search performed by the multimedia content applications 160 may not have completed, prior to the response handler component 138 sending the reference address 148 to the client device 104 or the display device 108. Consequently, the content selection interface can initially exclude the results from the search performed by the multimedia content applications 160 executing on the client device 104 or the display device 108. The response handler component 138 can provide the instructions for rendering the content selection interface, along with the reference address 148, to the client device 104 or the display device 108.

Subsequent to presentation of the content selection interface at the client device 104 or the display device 108, an interaction with the placeholder element can cause the client device 104 or the display device 108 to determine whether the search performed by the multimedia content applications 160 is completed. The client device 104 or the display device 108 can determine that the search performed by the multimedia content applications 160 is completed. Responsive to the determination that the search is completed, the client device 104 or the display device 108 can modify the content selection interaction to include additional selection elements. Each additional selection element can correspond to the reference address 148 found during the search performed by the multimedia content applications 160 executing on the client device 104 or the display device 108. Interaction with the selection elements of the content selection element can cause the client device 104 or the display device 108 to launch the multimedia content application 160 (or another application running on the client device 104 or the display device 108) to play the one or more audiovisual files corresponding to the reference address 148 of the associated selection element.

On the other hand, the client device 104 or the display device 108 can determine that the search performed by the multimedia content applications 160 is not yet completed. Responsive to the determination that the search is not yet completed, the client device 104 or the display device 108 can wait for a predetermined amount of time. During the predetermined amount of time, the client device 104 or the display device 108 can determine that the search performed by the multimedia content applications 160 is completed. Responsive to the determination that the search is completed, the client device 104 or the display device 108 can modify the content selection interaction to include additional selection elements. The client device 104 or the display device 108 can determine that the predetermined amount of time has elapsed and that the search is not yet completed. Responsive to the determination that that the predetermined amount of time has elapsed and that the search is not yet completed, the client device 104 or the display device 108 can modify the content selection interface to remove the placeholder element.

Figure 2:
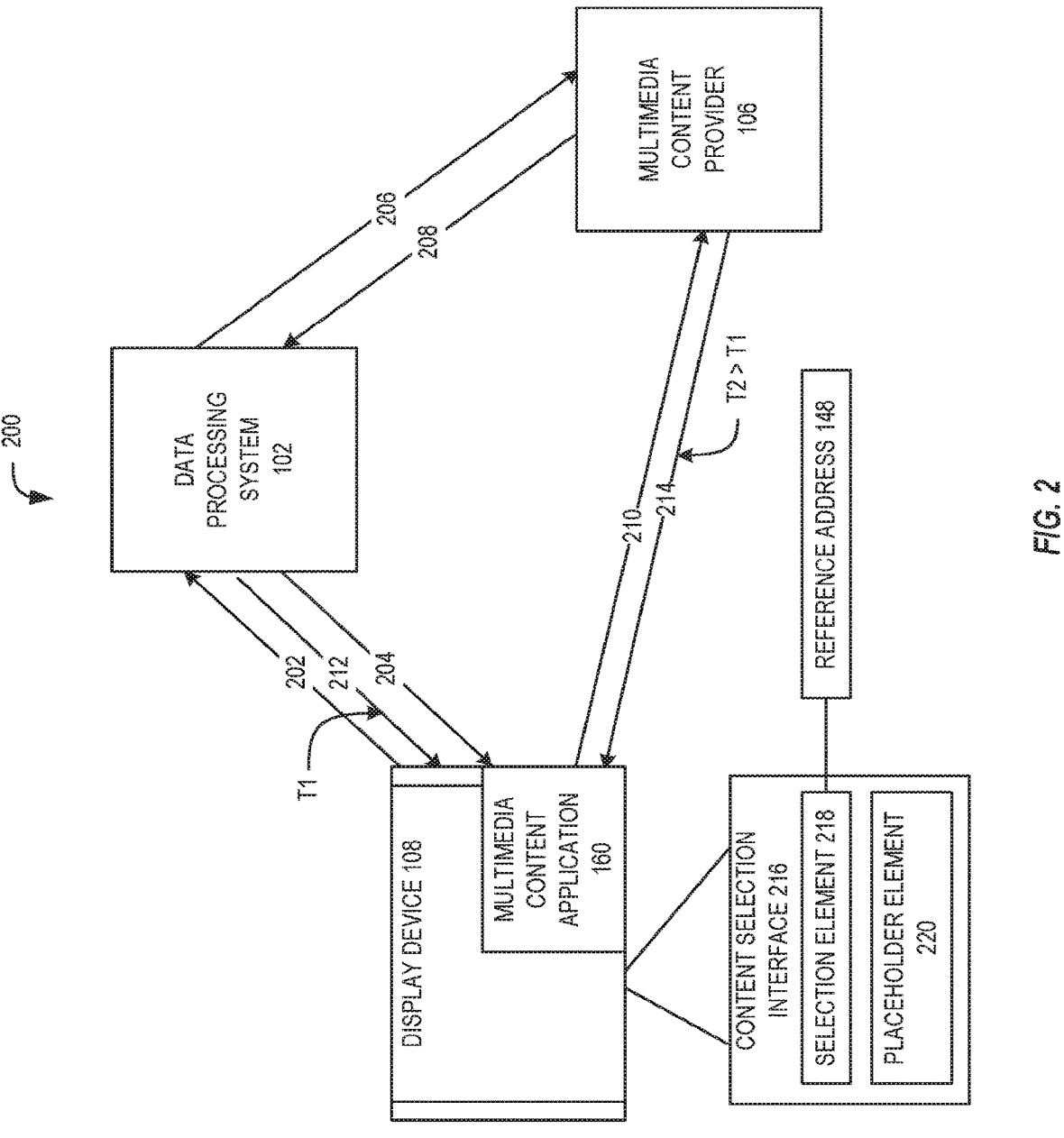
FIG. 2 illustrates a signal flow process diagram of the system illustrated in FIG. 1.

FIG. 2 illustrates a signal flow process diagram 200 of the system illustrated in FIG. 1. Responsive to detection of an audio input query, the display device 108 can send a data packet 202 with an audio input query to the data processing system 102. The data processing system 102 can in turn parse the audio input query and determine that the audio input query corresponds to a query request for multimedia content. The data processing system 102 can also identify the entity (e.g., words related to multimedia content) in the query request. The data processing 102 send a query command 204 to the display device 108 to trigger the display device 108 to initialize the multimedia content application 160. In initializing the multimedia content application 160, display device 108 can allocate memory, perform authentication with the multimedia content provider 106, and other processes. After initialization, the multimedia content application 160 can commence the search for the entity.

In the meanwhile, the data processing system 102 can search through a local cache (e.g., the data repository 140) to identify the reference address 148 corresponding to the entity and can send a query request 206 to the multimedia content provider 106. The query request 206 can include the entity identified from the audio input query. The multimedia content provider 106 may access its own data repository 162 to identify the reference address 148 corresponding to the entity 148, the multimedia content provider 106 can then return a search response 208 to the data processing system 102. The data processing system 102 can generate instructions for rending a content selection interface 216 at the display device 108. The content selection interface 216 can include a selection element 218 and a placeholder element 220. The selection element 218 can be associated with the reference address 148 found during the search by the data processing system 102. At time T$_1$, the data processing system 102 can send the instructions 212 to the display device 108. The display device 108 can then present the content selection interface 216.

At the display device 108, after initialization, the multimedia content application 160 can commence the search for the entity. The multimedia content application 160 can send a query request 210 to the multimedia content provider 106. The multimedia content provider 106 may access its own data repository 162 to identify the reference address 148 corresponding to the entity 148. At time T$_2$, the multimedia content provider 106 can then return a search response 214 to the data processing system 102. An interaction with the placeholder element 220 after time T$_2$ can cause the display device 108 to replace the placeholder element 220 with an additional selection element 218. The additional selection element 218 can be associated with the reference address 148 found during the search by the multimedia content application 160. Both searching at the local cache or pinging the multimedia content provider 106 may be faster than the search performed by the multimedia content application 160 on the display device 108, due to lower computing resources at the display device 108 and time consumed in initialization of the multimedia content application 160. As such, time T$_2$ may be greater than the T$_1$.

Figure 3:
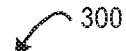
FIG. 3 illustrates a method to coordinate parallel processing of audio queries across multiple devices using the example system illustrated in FIG. 1.
Figure 3:
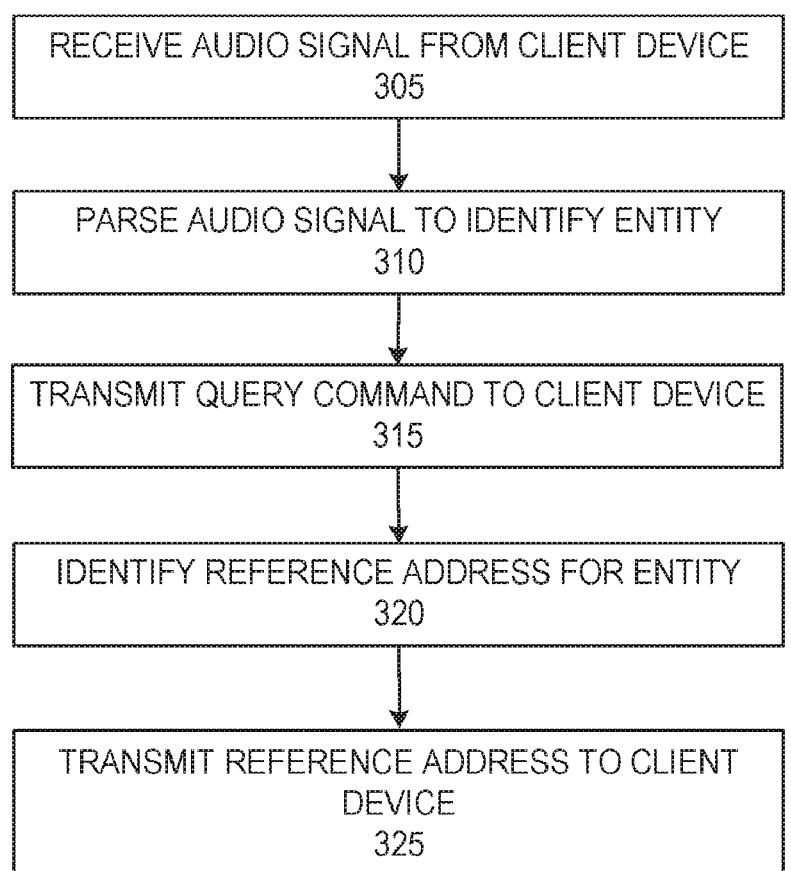

FIG. 3 illustrates an example method 300 to coordinate parallel processing of audio queries across multiple devices. The method 300 may be implemented or executed by the system 100 described above in conjunction with FIGS. 1 and 2 or system 400 detailed below in conjunction with FIG. 4. The method 300 can include receiving an audio signal from a display device (BLOCK 305). The method 300 can include parsing the audio signal to identify an entity (BLOCK 310). The method 300 can include transmitting a query command to the display device (BLOCK 315). The method 300 can include identifying a reference address for the entity (BLOCK 320). The method 300 can include transmitting the reference address to the display device (BLOCK 325).

The method 300 can include receiving an audio signal from a client device (BLOCK 305). For example, an NLP component of the data processing system can receive a data packet that can include the audio signal. The data processing system (and the NLP component) can be a component of or otherwise executed by a client device, a display device, or be a standalone device. The sensor, such as a microphone, at the client device or the display device can detect the input audio signal and then the respective client device or display device can transmit the input audio signal to the data processing system. For example, an application executed on the display device can detect a user speaking "Ok, play Bat Movie 2005." The detected utterance can be encoded into an input audio signal and transmitted to the NLP component of the data processing system or vehicle.

The method 300 can include parsing the audio signal to identify an entity (BLOCK 310). For example, the NLP component can parse the input audio signal to identify a request in the input audio signal. The NLP component can identify one or more words that form the request. From the one or more words, the NLP component can identify the entity using a semantic knowledge graph. The entity may be associated with multimedia content, and the semantic knowledge graph can include a set of words labeled as related or unrelated to multimedia content.

The method 300 can include transmitting a query command to the display device (BLOCK 315). For example, a search coordinator component of the data processing system can generate the query command for the display device. The query command can include the entity identified from the request of the audio signal. The query command can also include instructions indicating which multimedia content applications are to perform the search on the display device. The search coordinator component can send the query command to the display device. Upon receipt, the display device can initialize the multimedia content applications indicated in the query command to perform a search for the entity. The search coordinator component can also generate another query command for a multimedia content server. The query command for the multimedia content provider can include the entity to which to search for at a content database associated with the content server. The search coordinator component can send the query command to the multimedia content provider. Upon receipt, the multimedia content provider can perform a search for the entity.

The method 300 can include identifying a reference address for the entity (BLOCK 320). For example, a content indexer component of the data processing system can identify the reference address from at least one of a local cache (e.g., the data repository) and the multimedia content server. The content indexer component can maintain a local list of reference addresses for the entities at the local cache. The content indexer component can access the local cache to traverse the list of reference addresses and to identify the reference address corresponding to the entity. The content indexer component can also receive a search response from the multimedia content provider. The search response can include the reference address corresponding to the entity. The content indexer component can compare the reference address in the local cache with the reference address from the multimedia content provider to determine whether the reference address in the local cache is up-to-date.

The method 300 can include transmitting the reference address to the display device (BLOCK 325). For example, a response handler component can generate instructions for rendering a content selection interface with the reference address. The content selection interface can include a selection element and a placeholder element. The selection element can correspond to the reference address found by the data processing system. The response handler component can send the instructions for rendering the content selection interface to the display device. When received, the display device can present the content selection interface. Subsequent interaction with the placeholder element can cause the display device to update the content selection interface with its own search performed by the multimedia content application.

Figure 4:
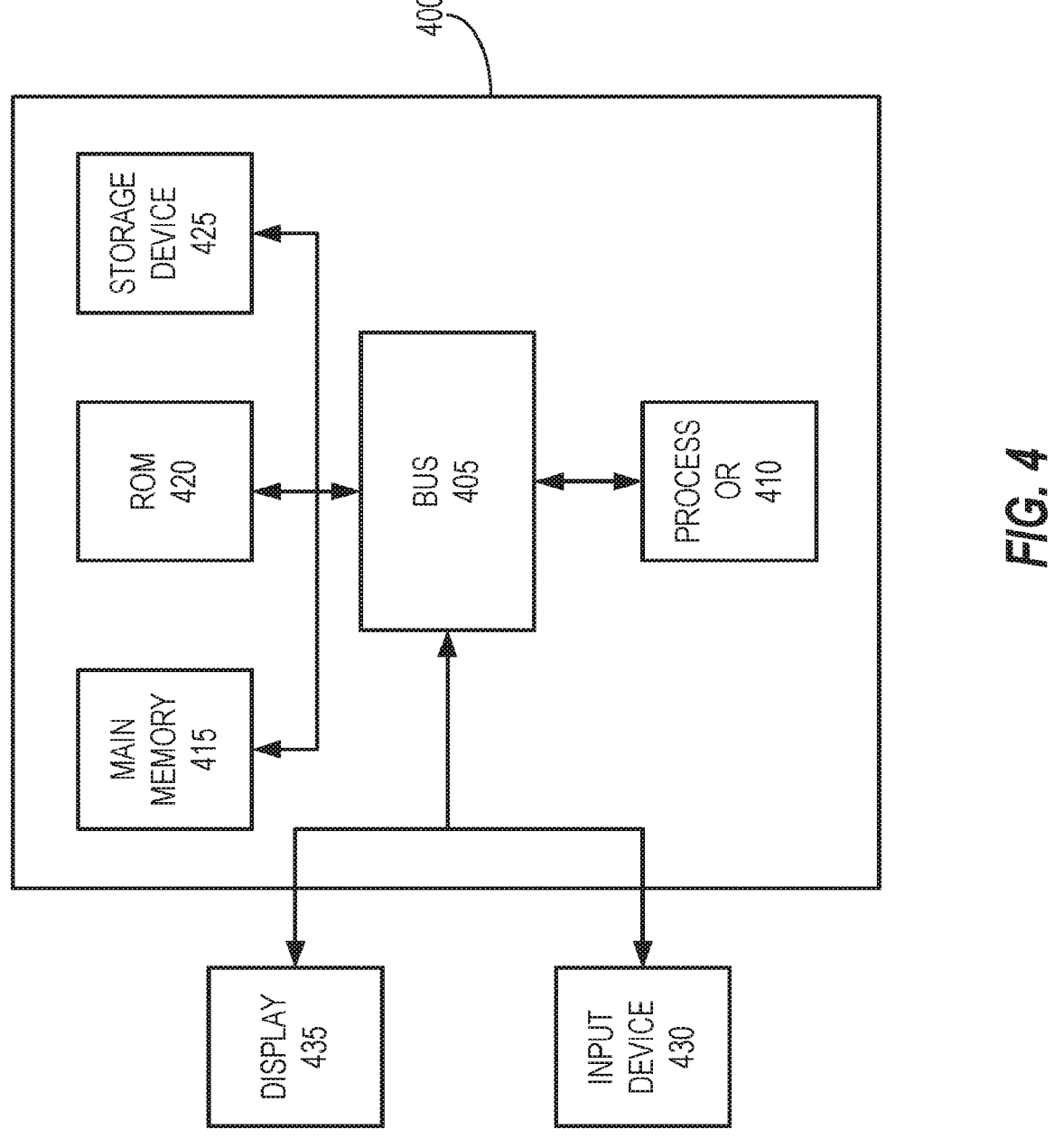
FIG. 4 is a block diagram of an example computer system.

FIG. 4 is a block diagram of an example computer system 400. The computer system or computing device 400 can include or be used to implement the system 100 or its components such as the data processing system 102, the client device 104, the multimedia content provider 106, and the display device 108. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information and instructions to be executed by the processor 410. The main memory 415 can be or include the data repository 140. The main memory 415 can also be used for storing position information, temporary variables, or other intermediate information during execution of instructions by the processor 410. The computing system 400 may further include a read-only memory (ROM) 420 or other static storage device coupled to the bus 405 for storing static information and instructions for the processor 410. A storage device 425, such as a solid state device, magnetic disk or optical disk, can be coupled to the bus 405 to persistently store information and instructions. The storage device 425 can include or be part of the data repository 140.

The computing system 400 may be coupled via the bus 405 to a display 435, such as a liquid crystal display or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the data processing system 102, the client devices 104, the display devices 108, or other component of FIG. 1, for example.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions, or activities; a user's preferences; or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage multimedia for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial-access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or multimedia (e.g., multiple CDs, disks, or other storage devices). The operations described in this specification can be implemented as operations performed by a data processing apparatus on data stored on one or more computer-readable storage devices or received from other sources.

The terms "data processing system," "computing device," "component," or "data processing apparatus" encompass various apparatuses, devices, and machines for processing data, including, by way of example, a programmable processor, a computer, a system on a chip, or multiple ones, or combinations of the foregoing. The apparatus can include special-purpose logic circuitry, e.g., an FPGA (field-programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The components of system 100 can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102, the client device 104, the multimedia content provider 106, and the display device 108) to perform actions by operating on input data and generating output. The processes and logic flows can also be performed by, and apparatuses can also be implemented as, special purpose logic circuitry, e.g., an FPGA (field-programmable gate array) or an ASIC (application-specific integrated circuit). Devices suitable for storing computer program instructions and data include all forms of non-volatile memory, multimedia and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 400 can include clients and servers. A client and server are generally remote from each other and typically interact through a communication network (e.g., the network 110). The relationship of client and server arises by virtue of computer programs running on the respective computers and having a client-server relationship to each other. In some implementations, a server transmits data (e.g., data packets representing a content item) to a client device (e.g., for purposes of displaying data to and receiving user input from a user interacting with the client device). Data generated at the client device (e.g., a result of the user interaction) can be received from the client device at the server (e.g., received by the data processing system 102 from the client devices 104 or the display device 108).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 124 and the direct action API 126 can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations, elements, or acts of the systems and methods herein referred to in the singular may also embrace implementations including a plurality of these elements, and any references in plural to any implementation, element, or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation or embodiment, and references to "an implementation," "some implementations," "one implementation," or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Where technical features in the drawings, detailed description, or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed:

1. A method implemented by one or more processors, the method comprising:

receiving, from a first computing device, a data packet that includes an input query;

generating, based on the input query, a query command that includes at least an entity referenced in the input query;

transmitting, to the first computing device, the query command to cause the first computing device to process the query command locally at the first computing device to generate a first response associated with the entity;

transmitting, to a second computing device, in parallel with the transmitting of the query command to the first computing device, the query command to cause the second computing device to process the query command to generate a second response associated with the entity and transmit the second response associated with the entity to the first computing device; and transmitting, to the first computing device, instructions that cause the first computing device to render a content selection interface that includes the first response associated with the entity and the second response associated with the entity.

2. The method of claim 1, wherein the instructions that cause the first computing device to render the content selection interface include instructions that cause the first computing device to render the first response associated with the entity in response to the first response associated with the entity being generated.

3. The method of claim 2, wherein the instructions that cause the first computing device to render the content selection interface include instructions that cause the first computing device to render a placeholder, along with the first response associated with the entity, for the second response associated with the entity.

4. The method of claim 2, wherein the instructions that cause the first computing device to render the content selection interface include instructions that cause the first computing device to render the first response associated with the entity prior to the second response associated with the entity.

5. The method of claim 3, wherein the instructions that cause the first computing device to render the content selection interface include instructions that cause the first computing device to replace the placeholder with the second response associated with the entity in response to the second response associated with the entity being received.

6. The method of claim 4, wherein the content selection interface initially excludes the second response associated with the entity prior to the second response associated with the entity being received, and wherein the content selection interface is updated to include the second response in response to the second response associated with the entity being received.

7. The method of claim 1, wherein the one or more processors are of a remote system, wherein the first computing device is a client device of a user that provided the input query, and wherein the second computing device is an additional remote system that is in addition to the remote system.

8. The method of claim 7, wherein the client device generates the first response associated with the entity in response to receiving the query command that is generated by the remote system, and wherein the additional remote system generates the second response associated with the entity in response to receiving the query command that is generated by the remote system.

9. The method of claim 7, wherein the entity referenced in the input query is identified by the remote system and based on parsing the input query.

10. A system comprising:

at least one processor; and memory storing instructions that, when executed, cause the at least one processor to be operable to:

receive, from a first computing device, a data packet that includes an input query;

generate, based on the input query, a query command that includes at least an entity referenced in the input query;

transmit, to the first computing device, the query command to cause the first computing device to process the query command locally at the first computing device to generate a first response associated with the entity;

transmit, to a second computing device, in parallel with the transmitting of the query command to the first computing device, the query command to cause the second computing device to process the query command to generate a second response associated with the entity and transmit the second response associated with the entity to the first computing device; and transmit, to the first computing device, instructions that cause the first computing device to render a content selection interface that includes the first response associated with the entity and the second response associated with the entity.

11. The system of claim 10, wherein the instructions that cause the first computing device to render the content selection interface include instructions that cause the first computing device to render the first response associated with the entity in response to the first response associated with the entity being generated.

12. The system of claim 11, wherein the instructions that cause the first computing device to render the content selection interface include instructions that cause the first computing device to render a placeholder, along with the first response associated with the entity, for the second response associated with the entity.

13. The system of claim 12, wherein the instructions that cause the first computing device to render the content selection interface include instructions that cause the first computing device to replace the placeholder with the second response associated with the entity in response to the second response associated with the entity being received.

14. The system of claim 10, wherein the system is a remote system, wherein the first computing device is a client device of a user that provided the input query, and wherein the second computing device is an additional remote system that is in addition to the remote system.

15. The system of claim 14, wherein the client device generates the first response associated with the entity in response to receiving the query command that is generated by the remote system, and wherein the additional remote system generates the second response associated with the entity in response to receiving the query command that is generated by the remote system.

16. The system of claim 14, wherein the entity referenced in the input query is identified by the remote system and based on parsing the input query.

17. A non-transitory computer-readable storage medium storing instructions that, when executed, cause at least one processor to be operable to perform operations, the operations comprising:

receiving, from a first computing device, a data packet that includes an input query;

generating, based on the input query, a query command that includes at least an entity referenced in the input query;

transmitting, to the first computing device, the query command to cause the first computing device to process the query command locally at the first computing device to generate a first response associated with the entity;

transmitting, to a second computing device, in parallel with the transmitting of the query command to the first computing device, the query command to cause the second computing device to process the query command to generate a second response associated with the entity and transmit the second response associated with the entity to the first computing device; and transmitting, to the first computing device, instructions that cause the first computing device to render a content selection interface that includes the first response associated with the entity and the second response associated with the entity.

18. The non-transitory computer-readable storage medium of claim 17, wherein the instructions that cause the first computing device to render the content selection interface include instructions that cause the first computing device to render the first response associated with the entity in response to the first response associated with the entity being generated.

19. The non-transitory computer-readable storage medium of claim 18, wherein the instructions that cause the first computing device to render the content selection interface include instructions that cause the first computing device to render a placeholder, along with the first response associated with the entity, for the second response associated with the entity.

20. The non-transitory computer-readable storage medium of claim 19, wherein the instructions that cause the first computing device to render the content selection interface include instructions that cause the first computing device to replace the placeholder with the second response associated with the entity in response to the second response associated with the entity being received.

* * * * *